(12) United States Patent
Sasaki et al.

(10) Patent No.: US 7,787,690 B2
(45) Date of Patent: Aug. 31, 2010

(54) IMAGE COMPRESSION AND EXPANSION DEVICE

(75) Inventors: Gen Sasaki, Osaka (JP); Takashi Matsutani, Osaka (JP); Yusuke Nara, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 1192 days.

(21) Appl. No.: 10/976,766

(22) Filed: Nov. 1, 2004

(65) Prior Publication Data
US 2005/0094008 A1 May 5, 2005

(30) Foreign Application Priority Data
Nov. 5, 2003 (JP) .............................. 2003-375277

(51) Int. Cl.
*G06K 9/36* (2006.01)
(52) U.S. Cl. .................... 382/166; 348/222.1; 348/272
(58) Field of Classification Search ................ 382/166; 348/222.1, 272
See application file for complete search history.

(56) References Cited

U.S. PATENT DOCUMENTS

| 6,738,509 B2 * | 5/2004 | Yeo et al. ..................... 382/166 |
| 2002/0101524 A1 * | 8/2002 | Acharya ....................... 348/273 |
| 2003/0219156 A1 * | 11/2003 | Muraki ......................... 382/167 |
| 2004/0257453 A1 * | 12/2004 | Lee et al. .................. 348/222.1 |
| 2005/0213661 A1 * | 9/2005 | Xiang et al. ........... 375/240.16 |

FOREIGN PATENT DOCUMENTS

| JP | 1-264393 | 10/1989 |
| JP | 8-125978 | 5/1996 |
| JP | 09-16160 | 1/1997 |
| JP | 10-78769 | 3/1998 |
| JP | 11-69377 | 3/1999 |
| JP | 11-194997 | 7/1999 |
| JP | 11-225281 | 8/1999 |
| JP | 11-259605 | 9/1999 |
| JP | 2002-125184 | 4/2002 |
| JP | 2002-142065 | * 5/2002 |
| JP | 2003-150141 | 5/2003 |

OTHER PUBLICATIONS

Eiji Komoto, Mamoru Kondo and Takao Nakamura, "Image Compression (JPEG) LSI", Research and Development report of Oki Electric Industry Co., Ltd., Jan. 1, 1996, vol. 63, No. 1, pp. 33-38.

* cited by examiner

*Primary Examiner*—Vikkram Bali
*Assistant Examiner*—Eueng-Nan Yeh
(74) *Attorney, Agent, or Firm*—Oblon, Spivak, McClelland, Maier & Neustadt, L.L.P.

(57) ABSTRACT

RGB image data outputted from an ADC (3) is processed in an SPU (42) and an RPU (43) and then buffered into a memory (48) as YUV image data. The YUV image data is outputted from a YUV output unit (45), encoded by an image compression and expansion chip (5A) and transmitted to a main chip (4) by a DMAC (52). On the other hand, compressed moving image data stored in the memory (48) is transmitted to the image compression and expansion chip (5A) through the control by a DMAC (44), decoded therein, then converted into RGB image data in an RGB sampling unit (54) and inputted to the main chip (4) by the SPU (42) through a data line (14). With such a construction, it is possible to provide a circuit for compression and expansion, which allows connection with a main processing chip having no YUV input circuit without increasing circuit scale, maintaining general versatility of those circuits.

7 Claims, 10 Drawing Sheets

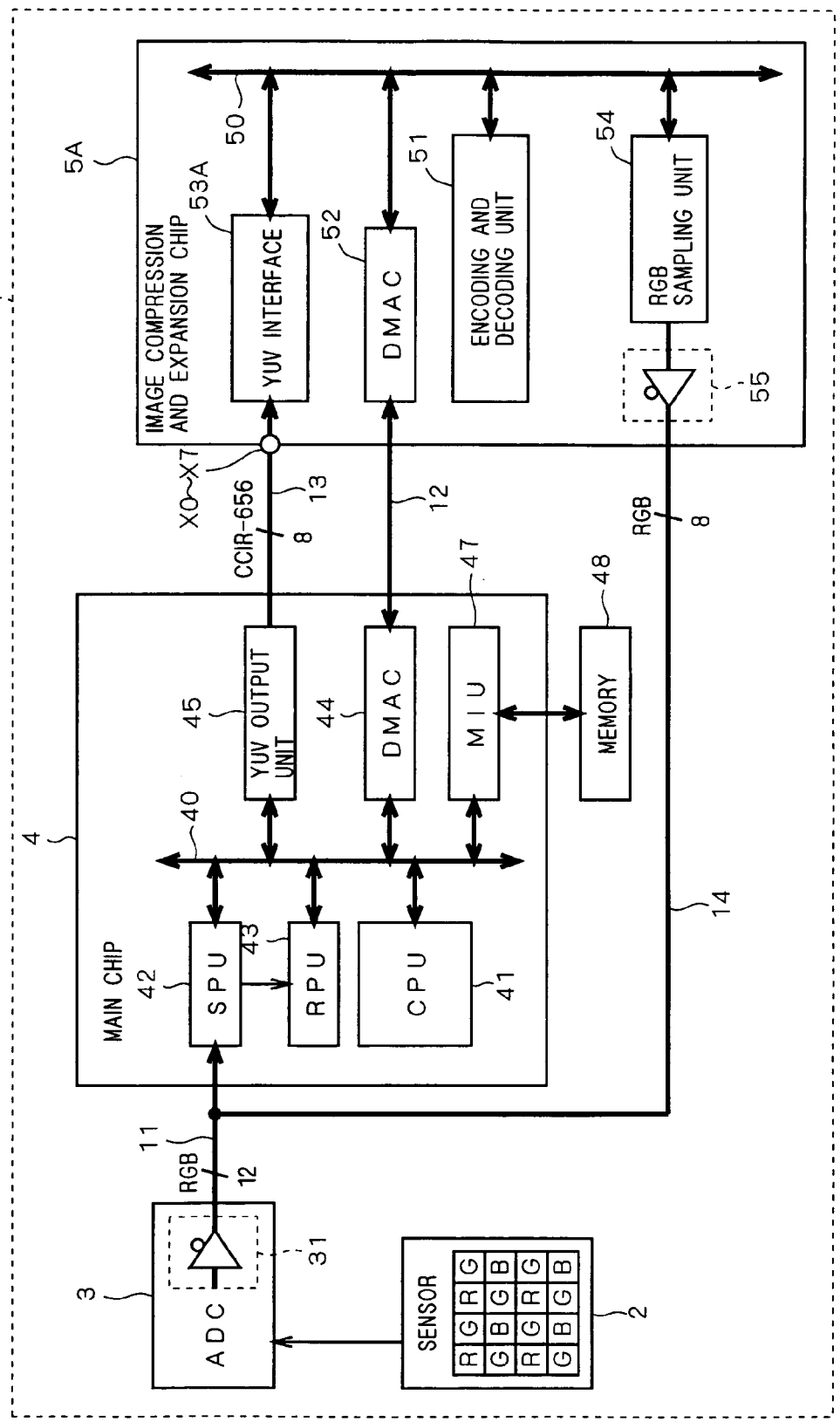
F I G. 1

F I G . 8
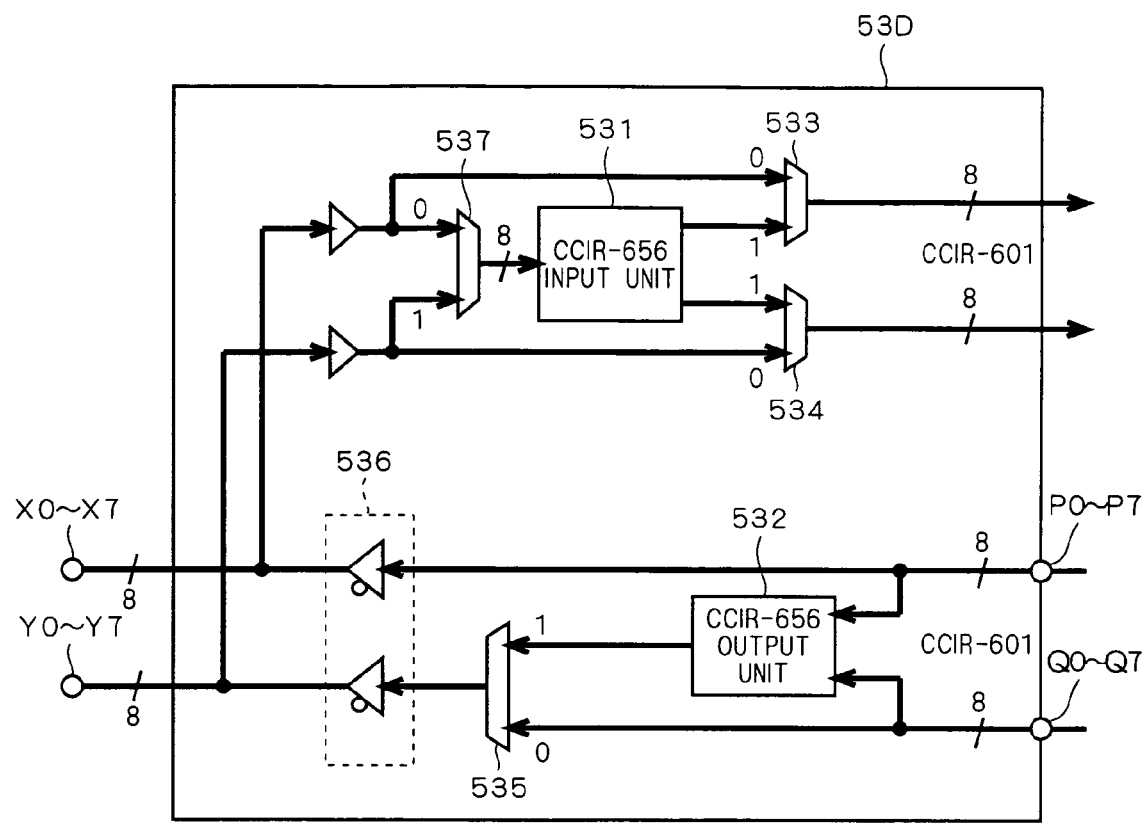

IMAGE COMPRESSION AND EXPANSION DEVICE

BACKGROUND OF THE INVENTION

1. Field of the Invention

The present invention relates to a device for performing compression and expansion of image data.

2. Description of the Background Art

Recently have been produced digital cameras capable of picking up moving images. Such a digital camera needs a circuit for converting image data outputted from a sensor such as a CCD into compressed data of moving image, and also needs a circuit for expanding the compressed data of moving image stored in a memory so as to be displayed on an LCD. Further, most of digital cameras each comprise a dedicated chip for compression and expansion, besides a chip for main processing to perform general control thereof. With such a construction, chips have general versatility.

Patent Document 1, Japanese Patent Application Laid Open Gazette No. 2003-150141, discloses a technique to increase the display speed for moving image data. Patent Document 2, Japanese Patent Application Laid Open Gazette No. 10-78769, discloses a technique to increase the speed for transmitting expanded image data on a bus and increase the efficiency of use of memories.

Most of sensors such as CCDs output RGB image data. Therefore, most of main processing chips each comprise an input interface for RGB image data outputted from the sensor. Further, most of the main processing chips each comprise an interface for outputting YUV image data to a display device such as an LCD. Alternatively, in some products, the main processing chip comprises an input interface for YUV image data.

Providing a variety of input interfaces to each chip for compression and expansion, however, even in order to adapt to various types of main processing chips, causes an increase in circuit scale and manufacturing cost, resulting in lower efficiency. Further, providing a variety of input interfaces to each main processing chip also results in lower efficiency.

Integrating a block for performing compression and expansion into the main processing chip, instead of providing a chip for compression and expansion independently, is another possible method to solve the above problem on interface, but this method can not maintain the general versatility of main processing chip and causes an increase in cost per main processing chip. Further, Patent Documents 1 and 2 disclose no method to solve the above problem, such as providing a circuit using a general-purpose chip.

SUMMARY OF THE INVENTION

The present invention is intended for an image compression and expansion device integrated into an electronic equipment.

According to an aspect of the present invention, the image compression and expansion device comprises a circuit for inputting YUV image data, an encoding and decoding unit for encoding YUV image data to generate compressed moving image data or decoding compressed moving image data to generate YUV image data, a circuit for inputting and outputting compressed moving image data, a converter circuit for converting the YUV image data generated in the encoding and decoding unit into RGB image data, and an RGB output circuit for outputting the RGB image data.

According to another aspect of the present invention, the image compression and expansion device comprises a YUV input/output unit for inputting and outputting YUV image data, an encoding and decoding unit for encoding YUV image data to generate compressed moving image data or decoding compressed moving image data to generate YUV image data and a circuit for inputting and outputting compressed moving image data, and in the image compression and expansion device of the present invention, the YUV input/output unit comprises first and second data lines capable of transmitting data of 8-bit width in parallel, respectively, a circuit for inputting 16-bit YUV image data based on the CCIR 601 standard in parallel by using the first and second data lines and a circuit for outputting 16-bit YUV image data based on the CCIR 601 standard in parallel by using the first and second data lines.

In the image compression and expansion device of the present invention, it is possible to transmit image data without an increase in circuit scale of a main chip and an image compression and expansion chip, while maintaining general versatility thereof.

Therefore, it is an object of the present invention to provide an image compression and expansion circuit capable of establishing connection with the main processing chip, while maintaining general versatility of circuits, without an increase in circuit scale.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a digital camera in accordance with a first preferred embodiment;

FIG. 8 is a block diagram showing a YUV interface in accordance with the fifth preferred embodiment;

DESCRIPTION OF THE PREFERRED EMBODIMENTS

Figure 2:
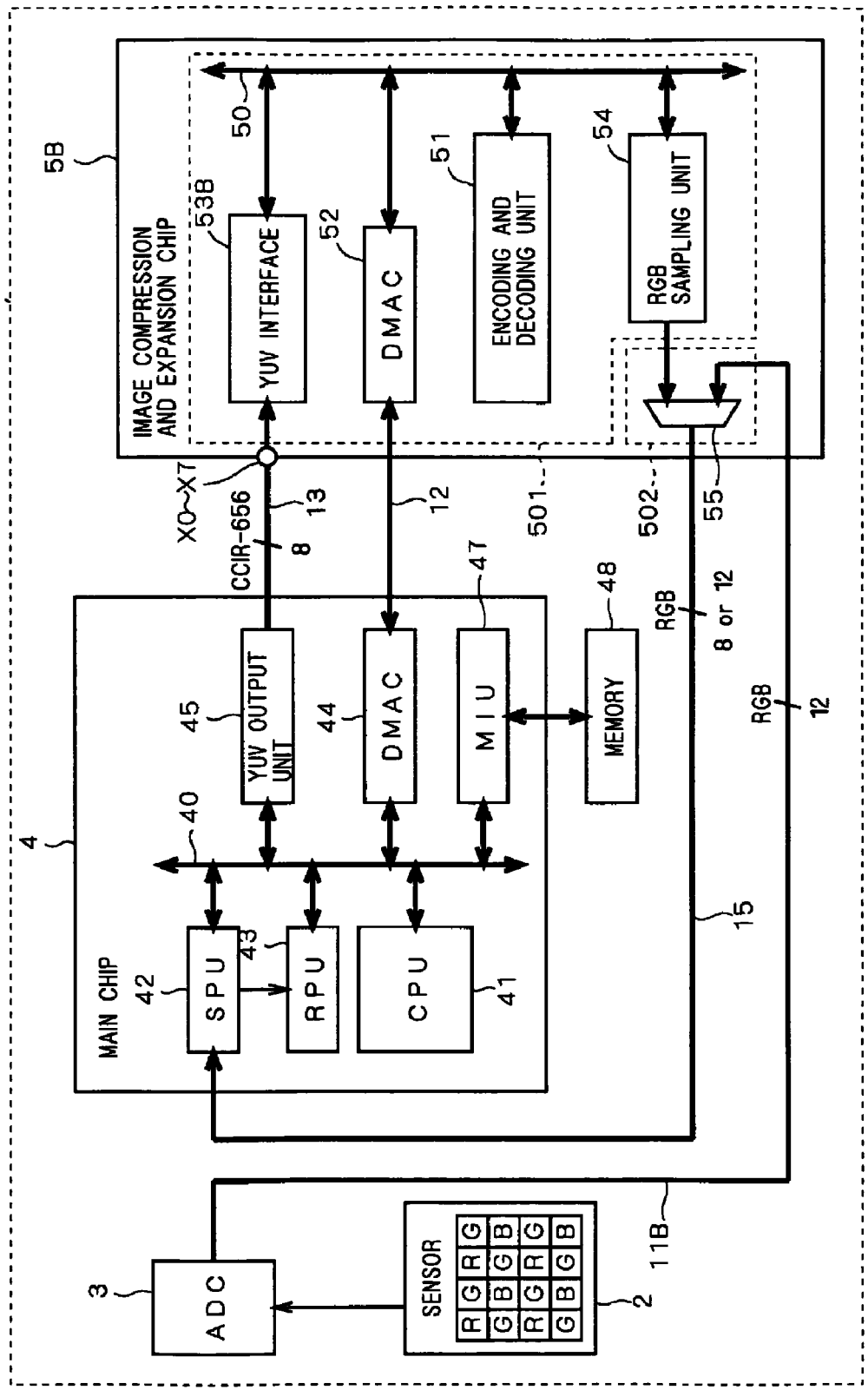
FIG. 2 is a block diagram showing a digital camera in accordance with a second preferred embodiment.

Hereafter, preferred embodiments of the present invention will be discussed, referring to figures. In the following preferred embodiments, a case where an image compression and expansion chip of the present invention is integrated in a digital camera will be discussed but the image compression and expansion chip of the present invention can be applied to electronic equipments other than the digital camera.

The First Preferred Embodiment

FIG. 1 is a block diagram showing a digital camera 1 in accordance with the first preferred embodiment. The digital camera 1 comprises a sensor 2 for picking up an image of a subject, an ADC 3, a main chip 4 for performing general control of the digital camera 1 and an image compression and expansion chip 5A for performing compression and expansion of a moving image.

The sensor 2 of the first preferred embodiment is formed of a 1-chip CCD comprising color filters of RGB Bayer array, and converts light received from a subject into an electrical signal of RGB and outputs the electrical signal. Further, the sensor 2 can pick up a moving image by continuously converting lights received from the subject into electrical signals. The sensor 2 may be alternatively formed of a CMOS sensor.

The ADC 3 has a function of converting analog RGB image data outputted from the sensor 2 into digital RGB image data. In the first preferred embodiment, the ADC 3 outputs 12-bit RGB image data for each color. Therefore, a data line 11 connected from the ADC 3 to the main chip 4 has a width of at least 12 bits and can transmits 12-bit data in parallel. The RGB image data outputted from the ADC 3 is not limited to 12-bit data, but may have a format of 10 bits, 14 bits, 16 bits or the like.

The ADC 3 comprises a high-impedance control circuit 31 and can perform ON/OFF switching of output from the ADC 3 through high-impedance control.

The main chip 4 comprises a CPU 41, an SPU (Signal Processing Unit) 42 for inputting an image signal outputted from the sensor 2, an RPU (Realtime Processing Unit) 43 for performing an image processing in real time, a DMAC (Direct Memory Access Controller) 44, a YUV output unit 45 and an MIU (Memory Interface Unit) 47. To the MIU 47, a memory 48 is connected. These processing circuits 41 to 45 and 47 are connected to one another with a bus 40.

The SPU 42 performs processing such as defective pixel correction on an inputted digital image signal and then outputs the processed image signal to the bus 40 or the RPU 43. The RPU 43 has a function of performing various digital image processings, such as shading correction, pixel interpolation, gamma correction, color space conversion, edge enhancement and resolution conversion, in real time on the image signal inputted from the SPU 42. The image signal outputted from the RPU 43 or the SPU 42 to the bus 40 is stored in the memory 48 as YUV image data through the control by the CPU 41. Connection of the memory 48 is not limited to such a configuration as shown in FIG. 1 where the memory 48 is connected outside the main chip 4 but may be another configuration where it is connected within the main chip 4 as an internal memory.

The DMAC 44 is connected to a DMAC 52 included in the image compression and expansion chip 5A with a DMA data line 12. The main chip 4 can thereby transmit the data stored in the memory 48 to the image compression and expansion chip 5A through the control by the DMAC 44 without imposing any load on the CPU 41.

The YUV output unit 45 is a circuit for outputting the YUV image data and outputs YCbCr image data based on the CCIR 656 standard. In the CCIR 601 standard which is a general standard for YUV image data, Y data which is luminance data is outputted in a 8-bit format and Cb data and Cr data which are color difference data are outputted alternately in a 8-bit format. Therefore, in the CCIR 601 standard, 16-bit image data is outputted in parallel. On the other hand, in the CCIR 656 standard, these data are outputted in the order of Y data, Cb data, Y data and Cr data all in an 8-bit format, using a frequency twice that as in the CCIR 601 standard. In other words, the YUV image data pursuant to the CCIR 656 standard is data which is obtained by multiplexing the YUV image data pursuant to the CCIR 601 standard into 8-bit data. Therefore, in order to transmit the image data pursuant to the CCIR 656 standard, it is only necessary to provide an interface capable of transmitting data of 8-bit width in parallel. Further, though horizontal and vertical synchronizing signals (HD, VD) are buried in an image signal in the CCIR 656 standard, an interface for transmitting the horizontal and vertical synchronizing signals in independent lines is widely used.

The CCIR 656 standard is a developed type of the CCIR 601 standard and thought to be included in the CCIR 601 standard, but in this specification, for distinction, the CCIR 601 standard is a standard for transmitting YUV image data as 16-bit data in parallel and the CCIR 656 standard is a standard for transmitting YUV image data as 8-bit data in parallel. In the following discussion, the CCIR 656 standard includes an interface for transmitting HD and VD in independent lines.

To the YUV output unit 45, a data line 13 for transmitting 8-bit YUV image data pursuant to the CCIR 656 standard is connected and this data line 13 is connected to a YUV interface 53A included in the image compression and expansion chip 5A.

The image compression and expansion chip 5A comprises an encoding and decoding unit 51 which is a group of circuits for encoding and decoding image data, the DMAC 52, the YUV interface 53A, an RGB sampling unit 54 and a high-impedance control circuit 55. These processing circuits 51, 52, 53A and 54 are connected to one another with a bus 50.

As discussed above, the DMAC 52 is connected to the DMAC 44 with the DMA data line 12. Therefore, the image compression and expansion chip 5A can transmit compressed moving image data or the like to the main chip 4 through the control by the DMAC 52.

Figure 3:
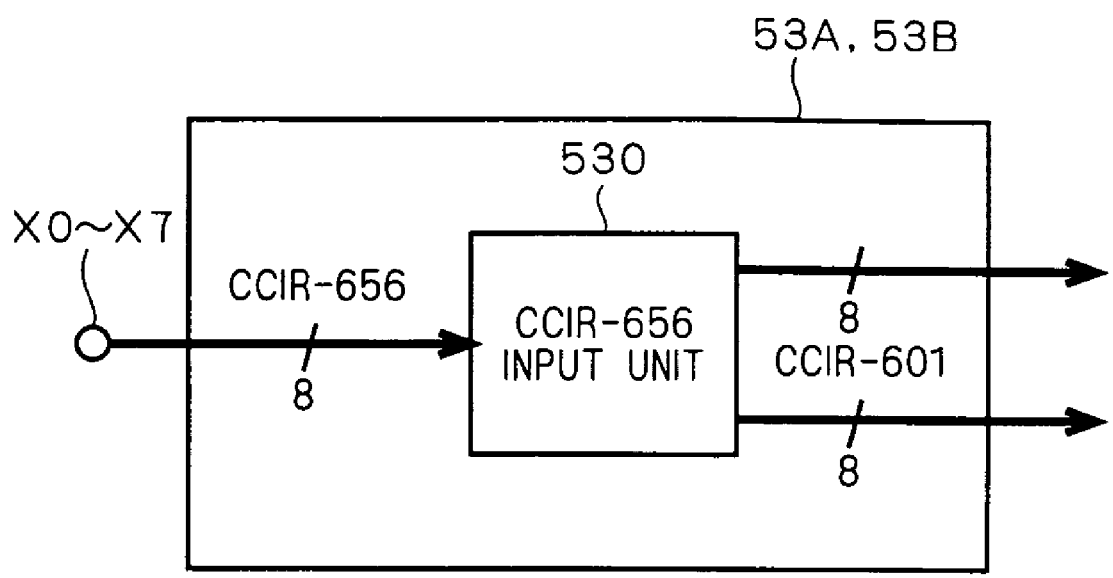
FIG. 3 is a block diagram showing a YUV interface in accordance with the first and second preferred embodiments.

The YUV interface 53A is connected to the YUV output unit 45 in the main chip 4 with the data line 13 as discussed above. The YUV interface 53A comprises a CCIR-656 input unit 530 which inputs YUV image data based on the CCIR 656 standard and outputs 16-bit YUV image data based on the CCIR 601 standard as shown in FIG. 3. In other words, the CCIR-656 input unit 530 has a function of converting data based on the CCIR 656 standard, i.e., data of one line through which Y data, Cb data and Cr data are alternately transmitted into data based on the CCIR 601 standard, i.e., data of two lines consisting of a luminance data line through which Y data are successively transmitted and a color difference data line through which Cb data and Cr data are alternately transmitted.

The data line 13 through which YUV image data based on the CCIR 656 standard is inputted to the YUV interface 53A consists of eight data lines and ports corresponding to the eight data lines are represented as ports X0 to X7 in FIGS. 1 and 3.

The RGB sampling unit 54 has a function of converting image data of YUV color space into image data of RGB color space. Specifically, the RGB sampling unit 54 samples data of one color (one of R, G, B) per pixel as RGB image data. The RGB image data outputted from the RGB sampling unit 54 thereby has the same format as the image data of RGB Bayer format outputted through the sensor 2 or the ADC 3. Further, through the control of the high-impedance control circuit 55, it is possible to perform ON/OFF switching of output from the RGB sampling unit 54. To the RGB sampling unit 54, a data line 14 is connected through the high-impedance control circuit 55. The data line 14 has an 8-bit data width for transmitting 8-bit image data which is sampled by the RGB sampling unit 54. Further, the data line 14 is connected to the data line 11 which connects the ADC 3 and the SPU 42. Since the data line 11 consists of twelve data lines, the data line 14 is connected to eight out of the twelve data lines.

Next, discussion will be made on an operation flow of moving image processing in the digital camera 1 with the above construction. First, when a moving image is picked up, RGB image data is continuously outputted from the ADC 3 and the RGB image data is inputted to the SPU 42 through the data line 11. At this time, the high-impedance control circuit 55 in the image compression and expansion chip 5A is switched OFF to stop the output from the RGB sampling unit 54. Therefore, in this mode, the SPU 42 receives only the RGB image data outputted from the ADC 3.

The RGB image data inputted to the SPU 42 is transmitted to the RPU 43. In the RPU 43, the RGB image data is subjected to some image processing, being converted into YUV image data, and then buffered into the memory 48. The YUV image data stored in the memory 48 is transmitted from the YUV output unit 45 to the image compression and expansion chip 5A through the data line 13.

In the image compression and expansion chip 5A, the YUV interface 53A, receiving the YUV image data as a stream of moving images, converts the YUV image data pursuant to the CCIR 656 standard into 16-bit data pursuant to the CCIR 601 standard and transmits the converted data to the encoding and decoding unit 51. Then, the encoding and decoding unit 51 generates compressed moving image data.

Next, the compressed moving image data is transmitted to the main chip 4 through the control by the DMAC 52. The compressed moving image data transmitted to the main chip 4 is stored into the memory 48. Through the above processings, the digital camera 1 picks up moving images and stores the compressed moving image data into the memory 48. Thus, since the moving image data having large size is first transmitted by using an output circuit dedicated to YUV for encoding and the encoded moving image data having small size is transmitted by using the DMAC, it is possible to increase processing speed. The data transmission after encoding may be performed through the control of the CPU, instead of using the DMAC.

Next, discussion will be made on a reverse processing, i.e., decoding of the compressed moving image data. First, through the control of the DMAC 44, the compressed moving image data stored in the memory 48 is transmitted to the image compression and expansion chip 5A. In the image compression and expansion chip 5A, the compressed moving image data transmitted by the DMAC 44 is transmitted to the encoding and decoding unit 51. The encoding and decoding unit 51 decodes the compressed moving image data to generate YUV image data.

Subsequently, the YUV image data generated in the encoding and decoding unit 51 is transmitted to the RGB sampling unit 54, and in the RGB sampling unit 54, the YUV image data is converted into RGB image data. Then, the high-impedance control circuit 55 switches ON of output of the RGB image data and the RGB image data is transmitted through the data line 14. At this time, the high-impedance control circuit 31 in the ADC 3 is switched OFF to stop the sensor output. Therefore, in this mode, the SPU 42 receives only the RGB image data outputted from the RGB sampling unit 54.

Thus, the compressed moving image data is decoded, then converted into RGB image data and inputted to the main chip 4. Then, the CPU 41 allows the RGB image data to be displayed on an LCD (not shown). Thus, since the compressed moving image data having small size is transmitted by using the DMAC for decoding and the decoded moving image data having large size is transmitted by using an output circuit dedicated to RGB, it is possible to increase processing speed.

Further, the data transmission before decoding may be performed through the control by the CPU 41, instead of using the DMAC.

As discussed above, in the first preferred embodiment, even if the main chip 4 has no input interface for YUV image data, it is possible for the main chip 4 to input the decoded moving image data by using a circuit for inputting the RGB image data from the sensor.

The Second Preferred Embodiment

Next, the second preferred embodiment will be discussed, referring to FIG. 2. The same constituents and operation steps as those in the first preferred embodiment will not be discussed herein and discussion will be mainly made on characteristic features different from those in the first preferred embodiment. In FIG. 2, the constituent elements identical to those in the first preferred embodiment are represented by the same reference signs.

An image compression and expansion chip 5B of the second preferred embodiment is different from the image compression and expansion chip 5A of the first preferred embodiment in that the image compression and expansion chip 5B further comprises a selector 55. The selector 55 has a function of receiving the RGB image data outputted from the RGB sampling unit 54 and the RGB image data outputted from the ADC 3 and selectively outputting either one of these data. Unlike the first preferred embodiment, the ADC 3 comprises no high-impedance control circuit. The image compression and expansion chip 5B of the second preferred embodiment can be applied to an electronic equipment which comprises the ADC 3 having no high-impedance control circuit.

In a case where the image compression and expansion chip 5B is integrated in the digital camera 1, a data line 11B for transmitting the output of the ADC 3 is not connected to the SPU 42 but to the selector 55. A data line 15 for transmitting an output from the selector 55 is connected to the SPU 42.

Now, discussion will be made on an operation flow of moving image processing in the digital camera 1 with the above construction. First, when a moving image is picked up, RGB image data is continuously outputted from the ADC 3 and the RGB image data is inputted to the selector 55 through the data line 11B. In an image pickup mode, the selector 55 is controlled by the CPU 41 to output the input data from the ADC 3 downstream. The RGB image data outputted from the ADC 3 is thereby inputted to the SPU 42 through the data line 15.

The processing after the RGB image data is inputted to the SPU 42 is the same as that in the first preferred embodiment, and specifically, YUV image data which is a stream of moving images is transmitted through the YUV output unit 45 and the YUV interface 53B, and compressed moving image data encoded in the encoding and decoding unit is transmitted to the main chip 4 through the control by the DMAC 52 and stored into the memory 48. As shown in FIG. 3, the constitution of the YUV interface 53B is the same as that of the YUV interface 53A in the first preferred embodiment.

Next, discussion will be made on a reverse processing, i.e., decoding of the compressed moving image data. First, through the control of the DMAC 44, the compressed moving image data stored in the memory 48 is transmitted to the image compression and expansion chip 5B. In the image compression and expansion chip 5B, the compressed moving image data transmitted by the DMAC 44 is transmitted to the encoding and decoding unit 51. The encoding and decoding unit 51 decodes the compressed moving image data to generate YUV image data.

Subsequently, the YUV image data generated in the encoding and decoding unit 51 is transmitted to the RGB sampling unit 54, and in the RGB sampling unit 54, the YUV image data is converted into 8-bit RGB image data. Then, the RGB image data outputted from the RGB sampling unit 54 is inputted to the selector 55. In decoding, the selector 55 is controlled by the CPU 41 to output the input data from the RGB sampling unit 54 downstream. The RGB image data outputted from the RGB sampling unit 54 is thereby inputted to the SPU 42 through the data line 15. Then, the CPU 41 allows the RGB image data to be displayed on an LCD (not shown). Though the RGB image data outputted from the RGB sampling unit 54 has an 8-bit width, since the RGB image data outputted from the ADC 3 has 12-bit width, the data line 15 is capable of transmitting at least 12-bit data in parallel.

Further, in the second preferred embodiment, in a usual image pickup mode (without encoding or decoding), it is not necessary to supply a main core circuit 501 in the image compression and expansion chip 5B with power, and only a local circuit 502 is supplied with power and a low power consumption mode is achieved.

As discussed above, in the second preferred embodiment, even if the main chip 4 has no input interface for YUV image data, it is possible for the main chip 4 to input the decoded moving image data by using a circuit for inputting the RGB image data from the sensor. Further, unlike the first preferred embodiment, even if the ADC 3 has no high-impedance control circuit, it is possible to establish connection between the image compression and expansion chip 5B and the main chip 4.

The Third Preferred Embodiment

Figure 4:
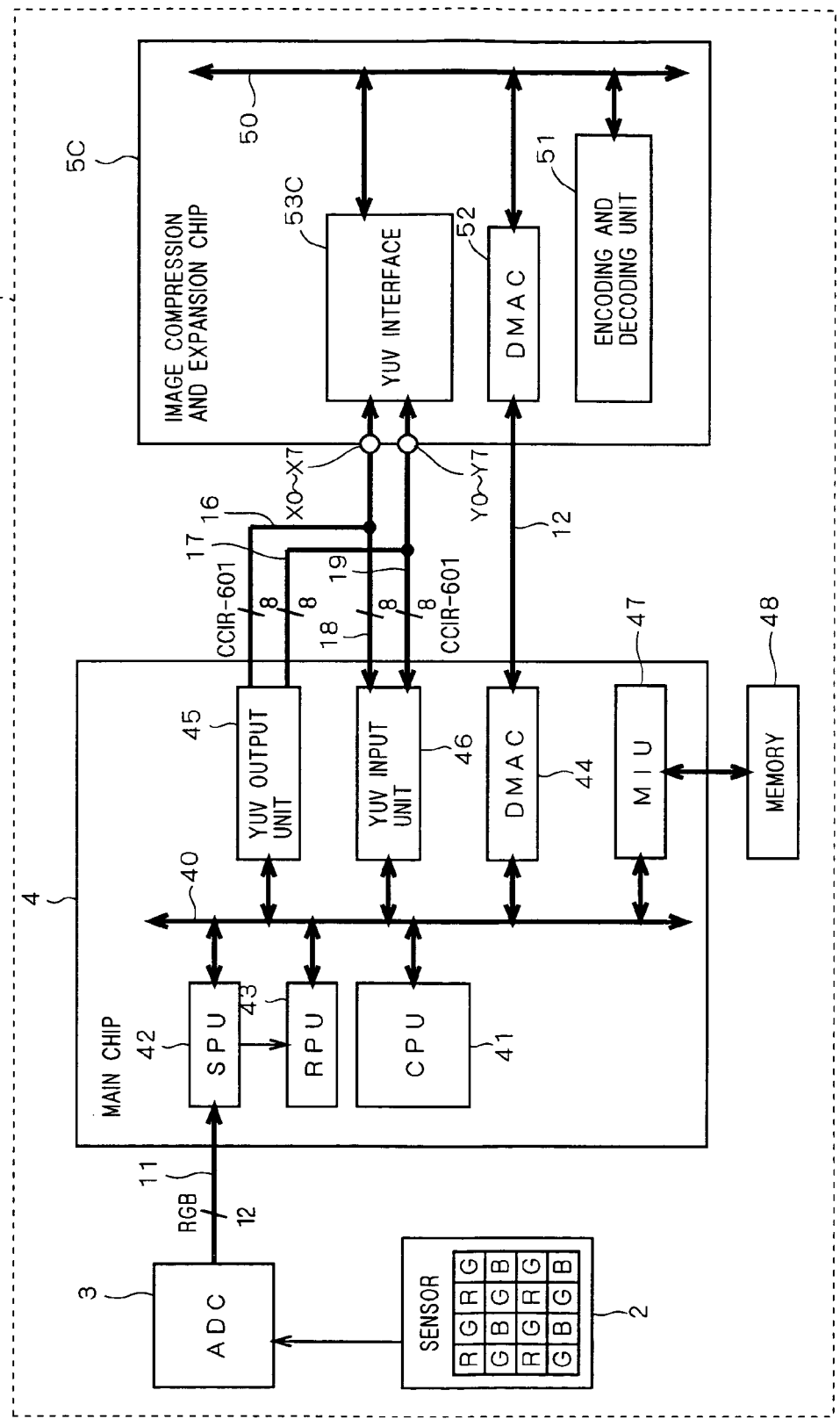
FIG. 4 is a block diagram showing a digital camera in accordance with a third preferred embodiment.

Next, the third preferred embodiment will be discussed, referring to FIG. 4. The same constituents and operation steps as those in the first preferred embodiment will not be discussed herein and discussion will be mainly made on characteristic features different from those in the first preferred embodiment. In FIG. 4, the constituent elements identical to those in the first preferred embodiment are represented by the same reference signs.

Figure 6:
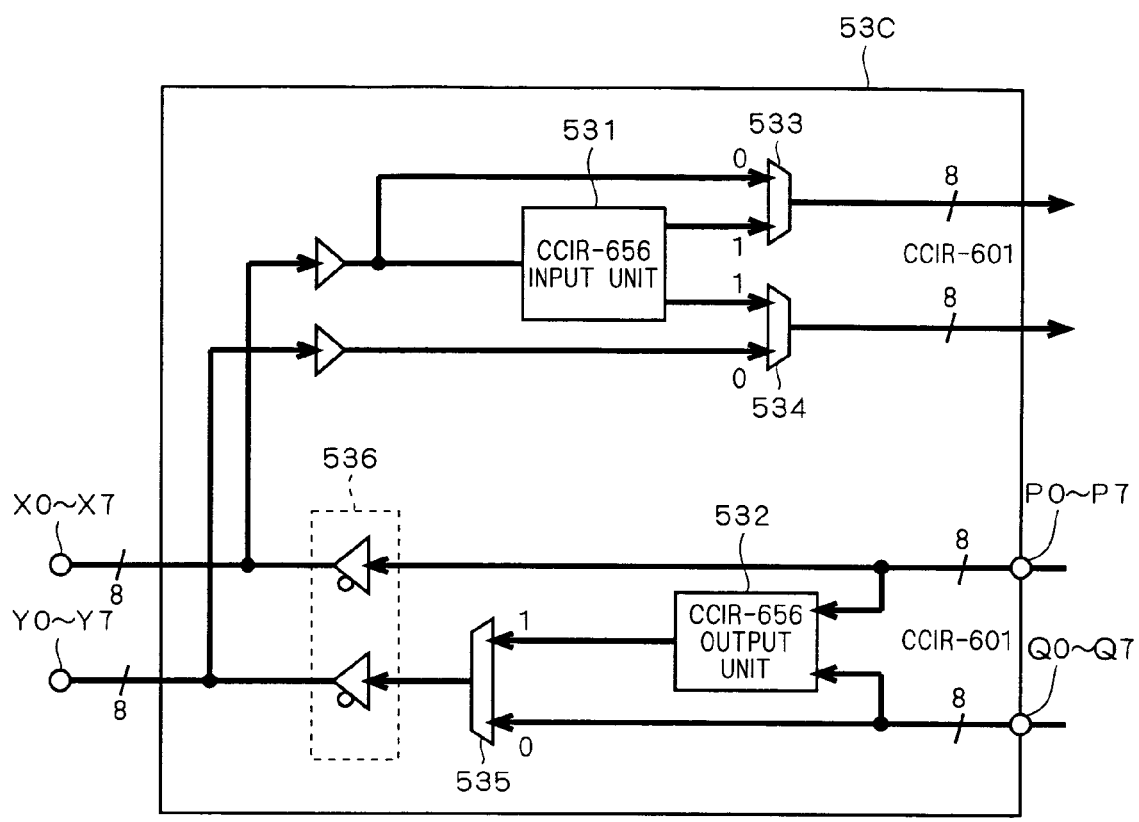
FIG. 6 is a block diagram showing a YUV interface in accordance with the third and fourth preferred embodiments.

In the third preferred embodiment, the main chip 4 further comprises a YUV input unit 46. A YUV interface 53C included in an image compression and expansion chip 5C is different from the YUV interface 53A of the first preferred embodiment or the YUV interface 53B of the second preferred embodiment, as shown in FIG. 6. The image compression and expansion chip 5C is different from the image compression and expansion chip 5A or the image compression and expansion chip 5B in that the image compression and expansion chip 5C comprises no RGB sampling unit.

The characteristic feature of the third preferred embodiment lies in that 16-bit YUV image data based on the CCIR 601 standard is transmitted between the main chip 4 and the image compression and expansion chip 5C. To the YUV output unit 45, data lines 16 and 17 each having an 8-bit width are connected, and for example, luminance data Y is transmitted through the data line 16 and color difference data Cb and Cr are transmitted through the data line 17. To the YUV input unit 46, data lines 18 and 19 each having an 8-bit width are connected, and for example, luminance data Y is transmitted through the data line 18 and color difference data Cb and Cr are transmitted through the data line 19.

The data line 16 is connected to the data line 18, and the connected eight data lines 18 (16) are connected to the YUV interface 53C through ports X0 to X7 of the image compression and expansion chip 5C. The data line 17 is connected to the data line 19, and the connected eight data lines 19 (17) are connected to the YUV interface 53C through ports Y0 to Y7 of the image compression and expansion chip 5C. Thus, the sixteen ports X0 to X7 and Y0 to Y7 of the image compression and expansion chip 5C are shared for input/output data transmission.

As shown in FIG. 6, the YUV interface 53C comprises a CCIR-656 input unit 531, a CCIR-656 output unit 532, selectors 533 to 535 and a high-impedance control circuit 536.

As discussed above, the YUV interface 53C inputs 16-bit YUV image data from the ports X0 to X7 and Y0 to Y7. The data inputted from the ports X0 to X7 are inputted to the selector 533 through a buffer and the data inputted from the ports Y0 to Y7 are inputted to the selector 534 through a buffer. In this case, when the YUV image data is inputted from the main chip 4, a selection signal of "0" is given to the selectors 533 and 534. The selector 533 thereby outputs the input data from the ports X0 to X7 downstream and the selector 534 thereby outputs the input data from the ports Y0 to Y7 downstream. When the YUV image data based on the CCIR 601 standard is thereby inputted from the YUV interface 53C, the YUV image data is transmitted to the encoding and decoding unit 51 through the bus 50.

On the other hand, the YUV image data pursuant to the CCIR 601 standard which is decoded in the encoding and decoding unit 51 is inputted to the YUV interface 53C through the bus 50. Also in this case, the 16-bit YUV image data is inputted to the YUV interface 53C in parallel. Out of the 16-bit YUV image data, 8-bit luminance data Y (or color difference data Cb or Cr) is inputted from ports P0 to P7 and outputted from the ports X0 to X7 to the main chip 4 through the high-impedance control circuit 536. Out of the 16-bit YUV image data, 8-bit color difference data Cb or Cr (or luminance data Y) is inputted from ports Q0 to Q7 and inputted to the selector 535. When the YUV image data is outputted to the main chip 4, the selection signal of "0" is given to the selector 535. The selector 535 thereby outputs the input data from the ports Q0 to Q7 downstream. This data is then outputted to the main chip 4 from the ports Y0 to Y7 through the high-impedance control circuit 536.

When the YUV image data is inputted from the main chip 4, the high-impedance control circuit 536 is controlled to turn off outputting. On the other hand, when the YUV image data is outputted to the main chip 4, the high-impedance control circuit 536 is controlled to output the data inputted from the ports P0 to P7 and the data outputted from the selector 535 to the ports X0 to X7 and Y0 to Y7.

Next, discussion will be made on an operation flow of moving image processing in the digital camera 1 with the above construction. When a moving image is picked up by the sensor 2, the same processing as that in the first preferred embodiment is performed and the YUV image data is buffered into the memory 48. Next, the buffered YUV image data is transmitted to the image compression and expansion chip 5C through the YUV output unit 45 and the data lines 16 and 17. When the image compression and expansion chip 5C inputs the YUV image data based on the CCIR 601 standard through the YUV interface 53C, the inputted data is transmitted to the encoding and decoding unit 51. The compressed moving image data encoded in the encoding and decoding unit 51 is transmitted to the main chip 4 through the control by the DMAC 52 and stored in the memory 48. During this processing, as discussed above, the high-impedance control circuit 536 in the YUV interface 53C is controlled to turn off outputting.

Next, discussion will be made on a reverse processing, i.e., decoding of the compressed moving image data. First, through the control of the DMAC 44, the compressed moving image data stored in the memory 48 is transmitted to the image compression and expansion chip 5C. In the image compression and expansion chip 5C, the compressed moving image data transmitted by the DMAC 44 is transmitted to the encoding and decoding unit 51. The encoding and decoding unit 51 decodes the compressed moving image data to generate YUV image data.

Subsequently, the YUV image data generated in the encoding and decoding unit 51 is transmitted to the YUV interface 53C through the bus 50 and the YUV image data based on the CCIR 601 standard outputted from the YUV interface 53C is inputted to the YUV input unit 46 in the main chip 4 through the data lines 18 and 19. During this processing, a not-shown high-impedance control circuit included in the YUV output unit 45 controls to turn off outputting from the YUV output unit 45. When the decoded YUV image data is thus transmitted to the main chip 4, the CPU 41 controls to display the data on the LCD.

As discussed above, in the third preferred embodiment, since the data lines used for transmitting the YUV image data between the main chip 4 having an input interface for the YUV image data and the image compression and expansion chip 5C are shared for input and output, it is possible to reduce the number of data lines and the circuit scale.

The Fourth Preferred Embodiment

Next, the fourth preferred embodiment will be discussed, referring to FIG. 5. The image compression and expansion chip 5C of the fourth preferred embodiment is the same as the image compression and expansion chip 5C of the third preferred embodiment. Since the main chip 4 has no YUV input unit 46, however, connection between the main chip 4 and the image compression and expansion chip 5C is different. In the fourth preferred embodiment, the main chip 4 can input the YUV image data in a circuit for inputting the RGB image data from the ADC 3. The ADC 3 comprises the high-impedance control circuit 31 like the first preferred embodiment and the output data of the ADC 3 is connected to the SPU 42 through the data line 11.

Figure 5:
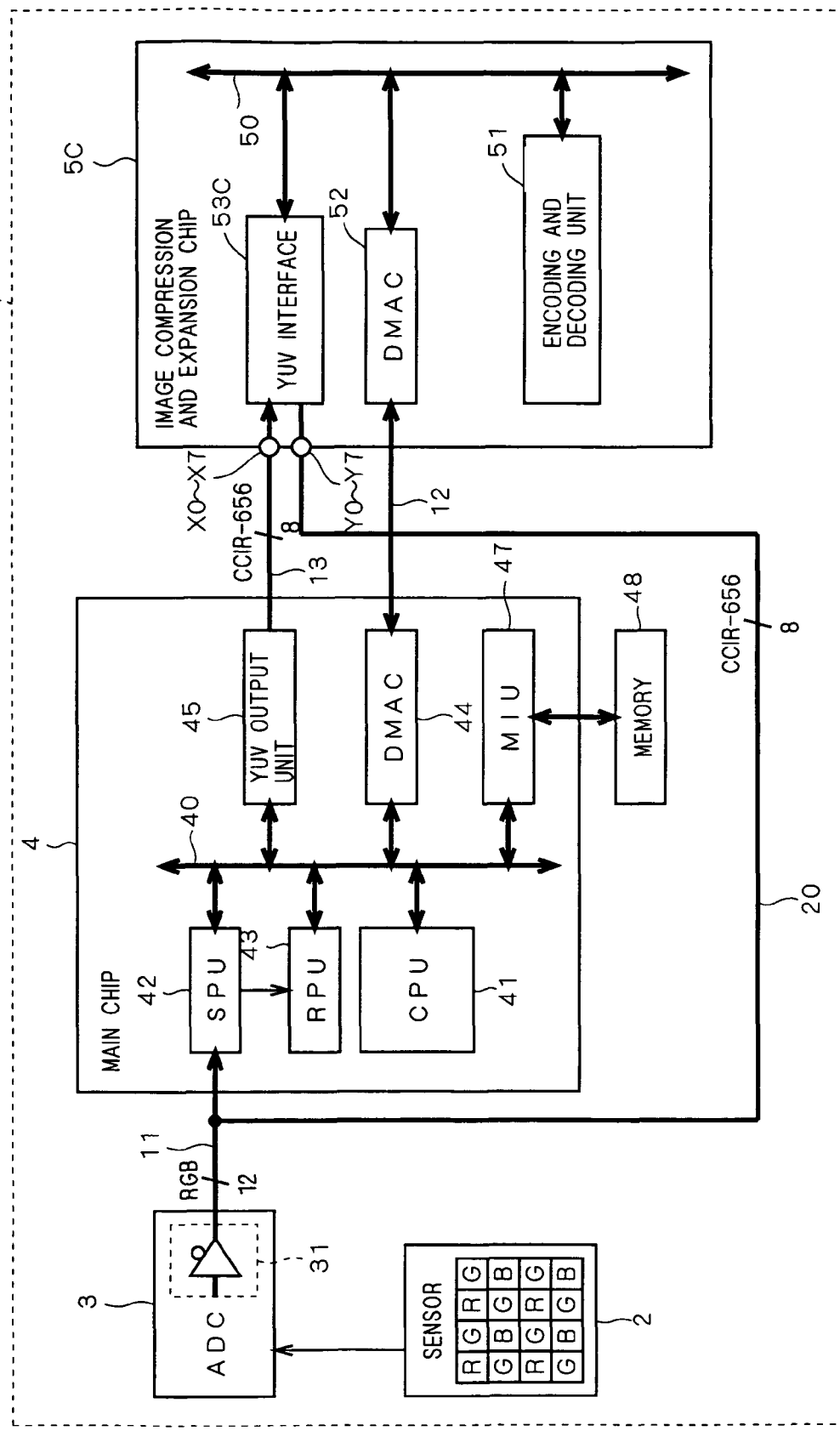
FIG. 5 is a block diagram showing a digital camera in accordance with a fourth preferred embodiment.

As shown in FIG. 5, the ports X0 to X7 in the image compression and expansion chip 5C are connected to the YUV output unit 45 through the data line 13. To the ports Y0 to Y7, a data line 20 is connected. The data line 20 is further connected to the data line 11 for connecting the ADC 3 and the SPU 42.

The constitution of the YUV interface 53C is the same as shown in FIG. 6, but an operation thereof is different. In the fourth preferred embodiment, the 8-bit YUV image data pursuant to the CCIR 656 standard is inputted from the ports X0 to X7. Transmission of the YUV image data is performed in such a manner as Y, Cb, Y, Cr, . . . , where the luminance data Y and the color difference data Cr or Cb are alternately transmitted.

The YUV image data inputted from the ports X0 to X7 are inputted to the CCIR-656 input unit 531 through a buffer, converted into data of two lines (8-bit luminance data Y and 8-bit color difference data Cr and Cb) based on the CCIR 601 standard and the converted data are outputted. The respective 8-bit data are inputted to the selectors 533 and 534. In the fourth preferred embodiment, when the YUV image data is inputted from the main chip 4, a selection signal of "1" is given to the selectors 533 and 534. The selectors 533 and 534 thereby output the YUV image data based on the CCIR 601 standard downstream, which is outputted from the CCIR-656 input unit 531. This output data is transmitted to the encoding and decoding unit 51 through the bus 50.

On the other hand, the YUV image data pursuant to the CCIR 601 standard which is decoded in the encoding and decoding unit 51 is inputted to the YUV interface 53C through the bus 50. In this case, the 16-bit YUV image data is inputted to the YUV interface 53C in parallel. Out of the 16-bit YUV image data, 8-bit luminance data Y (or color difference data Cb or Cr) is inputted from the ports P0 to P7 and 8-bit color difference data Cb or Cr (or luminance data Y) is inputted from the ports Q0 to Q7. Then, the 8-bit data are inputted to the CCIR-656 output unit 532. The CCIR-656 output unit 532 converts the data into the YUV image data pursuant to the CCIR 656 standard and outputs the converted data to selector 535. In the fourth preferred embodiment, when the YUV image data is outputted to the main chip 4, the selection signal of "1" is given to the selector 535. The selector 535 thereby outputs the input data from the CCIR-656 output unit 532 downstream. Then, this data is outputted from the ports Y0 to Y7 through the high-impedance control circuit 536.

When the YUV image data is inputted from the main chip 4, the high-impedance control circuit 536 is controlled to turn off outputting. On the other hand, when the YUV image data is outputted to the main chip 4, the high-impedance control circuit 536 is controlled to output the data outputted from the selector 535 to the ports Y0 to Y7.

Next, discussion will be made on an operation flow of moving image processing in the digital camera 1 with the above construction. When a moving image is picked up by the sensor 2, like in the processing of the first preferred embodiment, the YUV image data is buffered into the memory 48. Since the high-impedance control circuit 536 in the YUV interface 53C is controlled to turn off outputting during this processing, it is controlled to input only the output data from the ADC 3 to the SPU 42. Next, the buffered YUV image data is transmitted to the image compression and expansion chip 5C through the YUV output unit 45 and the data line 13. When the image compression and expansion chip 5C receives the YUV image data based on the CCIR 656 standard through the YUV interface 53C, the image compression and expansion chip 5C converts the input data into the YUV image data pursuant to the CCIR 601 standard and then transmits the converted data to the encoding and decoding unit 51. The compressed moving image data encoded in the encoding and decoding unit 51 is transmitted to the main chip 4 through the control by the DMAC 52 and stored in the memory 48.

Next, discussion will be made on a reverse processing, i.e., decoding of the compressed moving image data. First, through the control of the DMAC 44, the compressed moving image data stored in the memory 48 is transmitted to the image compression and expansion chip 5C. In the image compression and expansion chip 5C, the compressed moving image data transmitted by the DMAC 44 is transmitted to the encoding and decoding unit 51. The encoding and decoding unit 51 decodes the compressed moving image data to generate YUV image data.

Subsequently, the YUV image data generated in the encoding and decoding unit 51 is transmitted to the YUV interface 53C through the bus 50 and the YUV image data based on the CCIR 656 standard outputted from the YUV interface 53C is inputted to the SPU 42 through the data line 20. During this processing, the high-impedance control circuit 31 included in the ADC 3 is controlled to turn off outputting from the ADC 3. When the decoded YUV image data is thus transmitted to the main chip 4, the CPU 41 controls to display the data on the LCD.

As discussed above, in the fourth preferred embodiment, it is possible to transmit the YUV image data to the main chip 4 which allows input of the YUV image data with a circuit inputting the RGB image data from the sensor 2 with less number of data lines through the high-impedance control. Thus, the YUV interface 53C of the third and fourth preferred embodiments can be used for various operations depending on the constitution of the main chip 4.

The Fifth Preferred Embodiment

Next, the fifth preferred embodiment will be discussed, referring to FIG. 7. Herein, discussion will be made on the difference between the fifth preferred embodiment and the third preferred embodiment (FIG. 4). The fifth preferred embodiment is different from the third preferred embodiment in constitution of a YUV interface 53D. Further, in accordance with this difference, connection between the main chip 4 and an image compression and expansion chip 5D is different.

The characteristic feature of the fifth preferred embodiment lies in that the YUV image data pursuant to the CCIR 656 standard is transmitted between the main chip 4 and the image compression and expansion chip 5D. As shown in FIG. 7, to the YUV output unit 45, a data line 21 having an 8-bit data width is connected, and to the YUV input unit 46, a data line 22 having an 8-bit data width is connected. The data line 21 is connected to the data line 22 and the data line 21 (22) is connected to the YUV interface 53D through the ports Y0 to Y7 in the image compression and expansion chip 5D.

FIG. 8 is a block diagram showing the YUV interface 53D. The YUV interface 53D is different from the YUV interface 53C of the third preferred embodiment shown in FIG. 6 in that a selector 537 is additionally provided on an input side of the CCIR-656 input unit 531.

The 8-bit YUV image data pursuant to the CCIR 656 standard outputted from the YUV output unit 45 of the main chip 4 is inputted to the YUV interface 53D from the ports Y0 to Y7 through the data line 21. This data is inputted to the selector 537 through a buffer. In this operation mode, since the selection signal of "1" is given to the selector 537, the YUV image data inputted from the ports Y0 to Y7 is inputted to the CCIR-656 input unit 531 and herein converted into the YUV image data pursuant to the CCIR 601 standard, being divided into two lines of 8-bit data, and inputted to the selectors 533 and 534. In this operation mode, since the selection signal of "1" is given to the selectors 533 and 534, the YUV image data pursuant to the CCIR 601 standard which is converted in the CCIR-656 input unit 531 is outputted from the selectors 533 and 534. This output data is transmitted through the bus 50 to the encoding and decoding unit 51 and encoded therein.

The reverse processing, i.e., the decoding is performed like in the third preferred embodiment. The YUV image data pursuant to the CCIR 601 standard inputted from the ports P0 to P7 and Q0 to Q7 is outputted from the ports Y0 to Y7 as the YUV image data pursuant to the CCIR 656 standard.

Thus, the YUV interface 53D performs input/output of the YUV image data pursuant to the CCIR 656 standard, and both in inputting and outputting, the YUV interface 53D performs data transmission by using the ports Y0 to Y7.

Next, discussion will be made on an operation flow of moving image processing in the digital camera 1 with the above construction. When a moving image is picked up by the sensor 2, the same processing as that in the first preferred embodiment is performed and the YUV image data is buffered into the memory 48. Next, the buffered YUV image data is transmitted to the image compression and expansion chip 5D through the YUV output unit 45 and the data line 21. When the image compression and expansion chip 5D inputs the YUV image data based on the CCIR 656 standard through the YUV interface 53D, the inputted data is transmitted to the encoding and decoding unit 51. The compressed moving image data encoded in the encoding and decoding unit 51 is transmitted to the main chip 4 through the control by the DMAC 52 and stored in the memory 48. During this processing, as discussed above, the high-impedance control circuit 536 in the YUV interface 53D is controlled to turn off outputting.

Next, discussion will be made on a reverse processing, i.e., decoding of the compressed moving image data. First, through the control of the DMAC 44, the compressed moving image data stored in the memory 48 is transmitted to the image compression and expansion chip 5D. In the image compression and expansion chip 5D, the compressed moving image data transmitted by the DMAC 44 is transmitted to the encoding and decoding unit 51. The encoding and decoding unit 51 decodes the compressed moving image data to generate YUV image data.

Subsequently, the YUV image data generated in the encoding and decoding unit 51 is transmitted to the YUV interface 53D through the bus 50 and the YUV image data based on the CCIR 656 standard outputted from the YUV interface 53D is inputted to the YUV input unit 46 in the main chip 4 through the data line 22. During this processing, a not-shown high-impedance control circuit included in the YUV output unit 45 controls to turn off outputting from the YUV output unit 45. When the decoded YUV image data is thus transmitted to the main chip 4, the CPU 41 controls to display the data on the LCD.

As discussed above, in the fifth preferred embodiment, since the data lines used for transmitting the YUV image data between the main chip 4 having an input interface for the YUV image data and the image compression and expansion chip 5D are shared for input and output, it is possible to reduce the number of data lines.

Further, the YUV interface 53D of the fifth preferred embodiment can perform the same operation as that of the YUV interface 53C of the third and fourth preferred embodiments shown in FIGS. 4 and 5. Specifically, in FIG. 8, by giving the selection signal of "0" to the selectors 533, 534 and 535, it is possible to perform the same operation as in the third preferred embodiment. Further, by giving the selection signal of "0" to the selector 537 and the selection signal of "1" to the selectors 533, 534 and 535, it is possible to perform the same operation as in the fourth preferred embodiment. Thus, the image compression and expansion chip 5D can be adapted to various connections in accordance with the constitution of the main chip 4.

The Sixth Preferred Embodiment

Figure 9:
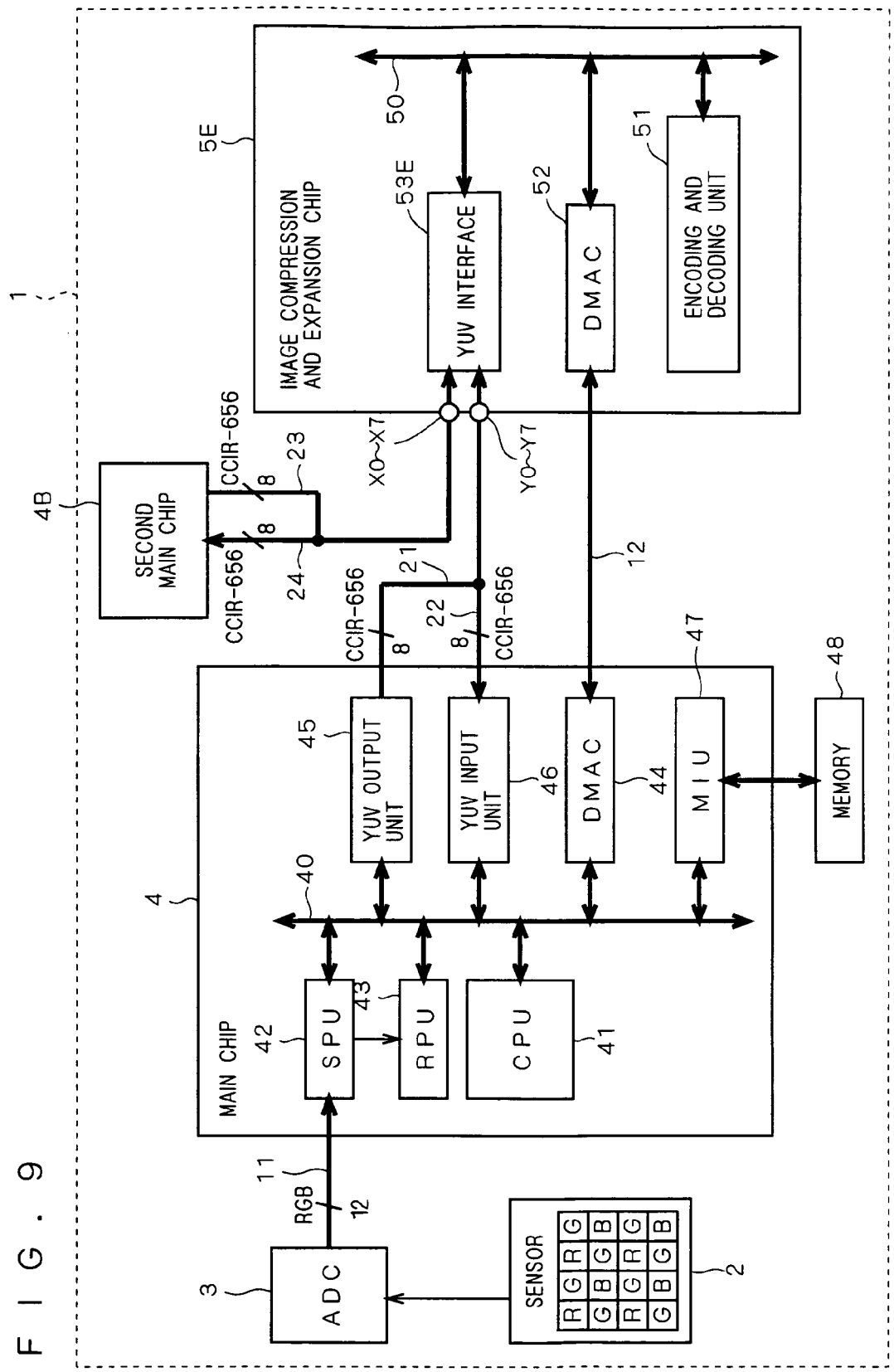
FIG. 9 is a block diagram showing a digital camera in accordance with a sixth preferred embodiment.

Next, the sixth preferred embodiment will be discussed, referring to FIG. 9. Herein, discussion will be made on the difference between the sixth preferred embodiment and the fifth preferred embodiment (FIG. 7). The sixth preferred embodiment is different from the fifth preferred embodiment in constitution of a YUV interface 53E.

The characteristic feature of the sixth preferred embodiment lies in that the YUV image data pursuant to the CCIR 656 standard is transmitted between the main chip 4 and the image compression and expansion chip 5E and the YUV image data pursuant to the CCIR 656 standard is transmitted between a second main chip 4B and the image compression and expansion chip 5E. The main chip 4 and the image compression and expansion chip 5E are connected to each other with the data lines 21 and 22 like in the fifth preferred embodiment. The second main chip 4B and the image compression and expansion chip 5E are connected to each other with data lines 23 and 24. The connection between the second main chip 4B and the image compression and expansion chip 5E is the same as that between the main chip 4 and the image compression and expansion chip 5E. Specifically, the data line 24 having an 8-bit data width is connected to a not-shown YUV input unit of the second main chip 4B and the data line 23 connected to a not-shown YUV output unit of the second main chip 4B is connected to the data line 24.

Figure 10:
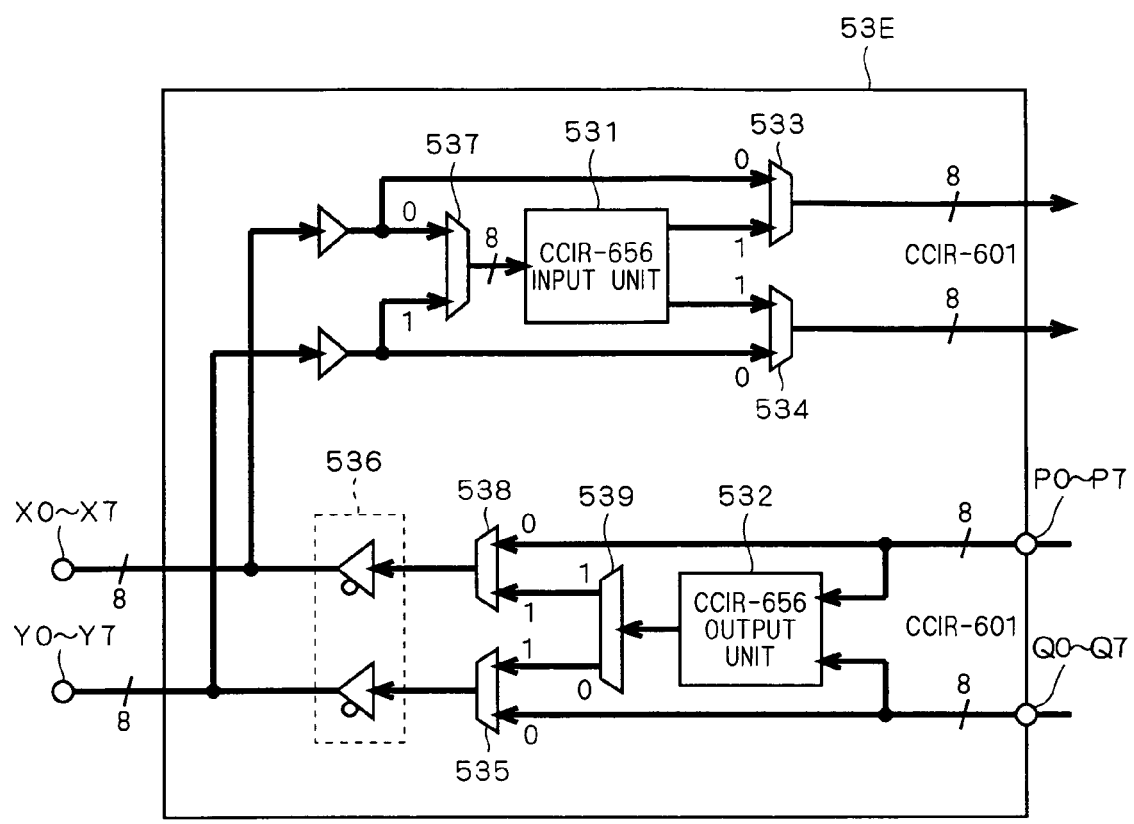
FIG. 10 is a block diagram showing a YUV interface in accordance with the sixth preferred embodiment.

FIG. 10 is a block diagram showing the YUV interface 53E. The YUV interface 53E is different from the YUV interface 53D of the fifth preferred embodiment shown in FIG. 8 in that selectors 538 and 539 are additionally provided on an output side of the CCIR-656 output unit 532.

First, discussion will be made on a case where the YUV image data is transmitted between the image compression and expansion chip 5E and the main chip 4. When the YUV image data is transmitted from the main chip 4 to the image compression and expansion chip 5E, the YUV image data pursuant to the CCIR 656 standard is inputted from the ports Y0 to Y7, and by giving the selection signal of "1" to the selector 537 and the selection signal of "1" to the selectors 533 and 534, the same operation as in the fifth preferred embodiment is performed.

Further, when the YUV image data is transmitted from the image compression and expansion chip SE to the main chip 4, the YUV image data pursuant to the CCIR 601 standard is inputted from the ports P0 to P7 and Q0 to Q7, and by giving the selection signal of "0" to the selector 539 and the selection signal of "1" to the selector 535, the same operation as in the fifth preferred embodiment is performed.

Next, discussion will be made on a case where the YUV image data is transmitted between the image compression and expansion chip 5E and the second main chip 4B. When the YUV image data is transmitted from the second main chip 4B to the image compression and expansion chip 5E through the data line 23, the YUV image data pursuant to the CCIR 656 standard is inputted from the ports X0 to X7, and by giving the selection signal of "0" to the selector 537 and the selection signal of "1" to the selectors 533 and 534, the YUV image data from the second main chip 4B is inputted.

Discussion will be made on a case where the YUV image data is transmitted from the image compression and expansion chip 5E to the second main chip 4B. The YUV image data pursuant to the CCIR 601 standard outputted from the encoding and decoding unit 51 through the bus 50 is inputted to the YUV interface 53E from the ports P0 to P7 and Q0 to Q7. These two lines of data are inputted to the CCIR-656 output unit 532, converted into the 8-bit YUV image data pursuant to the CCIR 656 standard and outputted to the selector 539. In a mode where the image compression and expansion chip 5E outputs the YUV image data to the second main chip 4B, since the selection signal of "1" is given to the selector 539 and the selection signal of "1" is given to the selector 538, the YUV image data inputted from the ports P0 to P7 and Q0 to Q7 is outputted from the ports X0 to X7 as the YUV image data pursuant to the CCIR 656 standard. This output data is transmitted to the second main chip 4B through the data line 24.

Thus, the YUV interface 53E inputs and outputs the YUV image data pursuant to the CCIR 656 standard, but uses the ports Y0 to Y7 for input to/output from the main chip 4 and uses the ports X0 to X7 for input to/output from the second main chip 4B. By using the image compression and expansion chip 5E of the sixth preferred embodiment, it is possible to transmit image data to/from a plurality of main chips. For example, this preferred embodiment can be applied to an electronic equipment having two image sensors.

Figure 7:
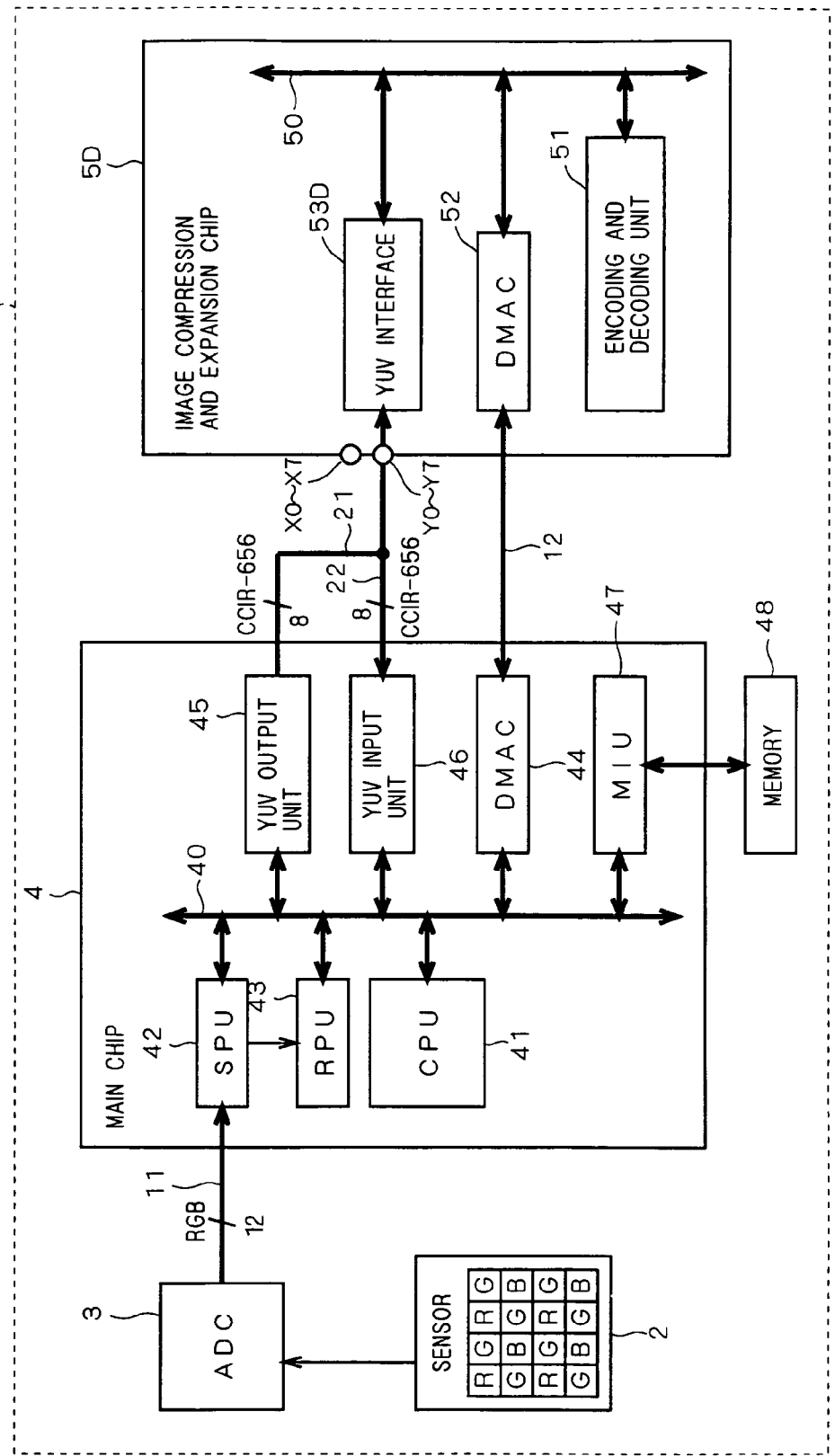
FIG. 7 is a block diagram showing a digital camera in accordance with a fifth preferred embodiment.

Further, the image compression and expansion chip 5E of the sixth preferred embodiment can perform the same operation as that of the image compression and expansion chips 5C and 5D of the third, fourth and fifth preferred embodiments shown in FIGS. 4, 5 and 7. Specifically, in FIG. 10, by giving the selection signal of "0" to the selectors 533, 534, 535 and 538, it is possible to perform the same operation as that of the third preferred embodiment. By giving the selection signal of "0" to the selectors 537 and 539 and giving the selection signal of "1" to the selectors 533, 534 and 535, it is possible to perform the same operation as that of the fourth preferred embodiment. The transmission of YUV image data between the image compression and expansion chip 5E and the main chip 4 is performed like in the fifth preferred embodiment. Thus, the image compression and expansion chip 5E can be applied to various connections.

While the invention has been shown and described in detail, the foregoing description is in all aspects illustrative and not restrictive. It is therefore understood that numerous modifications and variations can be devised without departing from the scope of the invention.

What is claimed is:

1. An image compression and expansion device integrated into an electronic equipment, comprising:
   an encoding and decoding unit for encoding inputted YUV image data to generate compressed moving image data, or decoding inputted compressed moving image data to generate YUV image data;
   an RGB sampling unit for outputting image data of RGB Bayer format by sampling data of one color per one pixel after converting said YUV image data generated in said encoding and decoding unit into RGB image data; and
   an output circuit for outputting said image data of RGB Bayer format outputted from said RGB sampling unit to outside of said image compression and expansion device.

2. The image compression and expansion device according to claim 1, further comprising
   a high-impedance control circuit for controlling output of said image data of RGB Bayer format from said output circuit.

3. The image compression and expansion device according to claim 2, wherein:
   said output circuit is connected to an input circuit that is external to said image compression and expansion device, and is capable of inputting image data of RGB Bayer format generated in an image sensor external to said image compression and expansion device, and
   said high impedance control circuit stops outputting of said outputting circuit when said image data of RGB Bayer format generated in said image sensor is inputted to said input circuit.

4. The image compression and expansion device according to claim 1, further comprising
   A selector inputting RGB image data outputted from an image sensor included in said electronic equipment and RGB image data outputted from said RGB output circuit, for selectively outputting either of said RGB image data.

5. The image compression and expansion device according to claim 1, wherein
   said electronic equipment includes a digital camera.

6. The image compression and expansion device according to claim 1, wherein said output circuit is connected to an input circuit that is external to said image compression and expansion device, and is capable of inputting image data of RGB Bayer format generated in image sensor external to said image compression and expansion device.

7. An image compression and expansion chip integrated into an electronic equipment, comprising:

an encoding and decoding unit for encoding inputted YUV image data to generate compressed moving image data, or decoding inputted compressed moving image data to generate YUV image data;

an RGB sampling unit for outputting image data of RGB Bayer format by sampling data of one color per one pixel after converting said YUV image data generated in said encoding and decoding unit into RGB image data; and an output circuit for outputting said image data of RGB Bayer format outputted from said RGB sampling unit to outside of said image compression and expansion device.

* * * * *